(12) United States Patent
Bansal et al.

(10) Patent No.: US 10,512,875 B2
(45) Date of Patent: Dec. 24, 2019

(54) FILTER AND FILTER MEDIA HAVING A FIBER BLEND

(71) Applicants: Vishal Bansal, Lee's Summit, MO (US); Jeffery Michael Ladwig, Overland Park, KS (US); Dale R. Kadavy, Overland Park, KS (US)

(72) Inventors: Vishal Bansal, Lee's Summit, MO (US); Jeffery Michael Ladwig, Overland Park, KS (US); Dale R. Kadavy, Overland Park, KS (US)

(73) Assignee: BHA Altair, LLC, Cleveland, OH (US)

( * ) Notice: Subject to any disclaimer, the term of this patent is extended or adjusted under 35 U.S.C. 154(b) by 316 days.

(21) Appl. No.: 15/410,336

(22) Filed: Jan. 19, 2017

(65) Prior Publication Data
US 2017/0209823 A1     Jul. 27, 2017

Related U.S. Application Data

(60) Provisional application No. 62/286,060, filed on Jan. 22, 2016.

(51) Int. Cl.
*B01D 46/52* (2006.01)
*B01D 39/08* (2006.01)
*B01D 39/16* (2006.01)
*B01D 46/00* (2006.01)

(52) U.S. Cl.
CPC ......... *B01D 46/521* (2013.01); *B01D 39/083* (2013.01); *B01D 39/163* (2013.01); *B01D 46/0001* (2013.01); *B01D 2239/1225* (2013.01); *B01D 2239/1233* (2013.01); *B01D 2239/1258* (2013.01); *B01D 2239/1291* (2013.01)

(58) Field of Classification Search
CPC .............. B01D 39/083; B01D 39/1623; B01D 39/163; B01D 46/0001; B01D 46/521; B01D 2239/1225; B01D 2239/1233; B01D 2239/1258; B01D 2239/1291
See application file for complete search history.

(56) References Cited

U.S. PATENT DOCUMENTS

| | | | |
|---|---|---|---|
| 4,444,574 A | 4/1984 | Tradewell et al. | |
| 6,287,686 B1 * | 9/2001 | Huang ............... | A41D 31/0022 428/362 |
| 2002/0129711 A1 * | 9/2002 | Oda ..................... | B01D 46/521 96/134 |
| 2004/0142620 A1 | 7/2004 | Kinsley et al. | |
| 2005/0233668 A1 | 10/2005 | Ogle et al. | |
| 2006/0083911 A1 | 4/2006 | Ogle et al. | |

(Continued)

*Primary Examiner* — Jason M Greene
(74) *Attorney, Agent, or Firm* — Reinhart Boerner Van Deuren P.C.

(57) ABSTRACT

A filter media is provided. The filter media has a blend of filter media fibers, including oxidized polyacrylonitrile (OPAN) fibers and fibers of at least one other polymer, such that the OPAN fibers comprise between 30% and 95% by weight of the blend. A filter element incorporating the filter media is also provided. A method of using the filter element is provided as well. Also provided is a method of manufacturing the filter media. The filter media has applicability for filtering air in such acidic environments as a cement factory, lime kiln, asphalt process, rock dust application, and coal fired boilers.

25 Claims, 5 Drawing Sheets

(56) References Cited

U.S. PATENT DOCUMENTS

| | | | |
|---|---|---|---|
| 2007/0130896 A1* | 6/2007 | Walz | B01D 46/521 55/486 |
| 2009/0301304 A1* | 12/2009 | Bass | B01D 46/0068 95/273 |
| 2011/0072974 A1* | 3/2011 | Patel | B01D 53/02 96/147 |
| 2014/0083066 A1* | 3/2014 | Bahukudumbi | B01D 46/0001 55/527 |

* cited by examiner

US 10,512,875 B2

FILTER AND FILTER MEDIA HAVING A FIBER BLEND

CROSS-REFERENCE TO RELATED PATENT APPLICATIONS

This patent application claims the benefit of U.S. Provisional Patent Application No. 62/286,060, filed Jan. 22, 2016, the entire teachings and disclosure of which are incorporated herein by reference thereto.

FIELD OF THE INVENTION

This invention generally relates to air filters, and more particularly, to air filters having a blend of fibers in the filter media.

BACKGROUND OF THE INVENTION

Filters used in industrial settings are typically more robust than standard HVAC filters because the filters are subject to harsher conditions. Frequently, such industrial filters are subject to elevated temperatures, acidic conditions, and high pressures. These harsh conditions put a significant strain on the filter media in the filter, which can cause the filter to fail.

Accordingly, the filter media in an industrial filter is typically made from a high-strength and temperature- and chemical-resistant fiber. Example fibers used in industrial filters include polyphenylene sulfide (PPS) and meta-aramid fibers. While these fibers are strong and resist degradation at elevated temperatures, they tend to lose a significant amount of strength when exposed to acidic conditions and/or other operating conditions, such as a highly oxidizing environment. Nevertheless, the PPS and aramid fibers are currently the fibers of choice for industrial applications despite problems with strength and/or performance during operation as will be realized once the present invention is understood.

BRIEF SUMMARY OF THE INVENTION

An object of the present invention is to provide a filter media blend that utilizes fibers with higher acid and oxidation resistance, especially oxidized polyacrylonitrile (OPAN) fibers, in conjunction with PPS and meta-aramid fibers, among others, such that the resulting filter media is capable of withstanding the high thermal and mechanical stresses associated with filter element manufacturing and such that improved industrial filtering properties can be achieved.

In one aspect, embodiments of the invention provide a filter media. The filter media includes a blend of filter media fibers, including oxidized polyacrylonitrile (OPAN) fibers and fibers of at least one other polymer. The OPAN fibers comprise between 30% and 95% by weight of the blend.

In another aspect, embodiments of the invention provide a filter media in which the at least one other polymer is meta-aramid.

In another aspect, embodiments of the invention provide a filter media in which the at least one other polymer is polyphenylene sulfide (PPS).

In another aspect, embodiments of the invention provide a filter media in which the OPAN fibers and the fibers of the at least one other polymer are mechanically entangled.

In another aspect, embodiments of the invention provide a filter media in which the filter media is a needlefelt and in which needlepunching entangles the OPAN fibers and the fibers of the at least one other polymers to form the needlefelt.

In another aspect, embodiments of the invention provide a filter media further including a scrim such that the OPAN fibers and the fibers of the at least one other polymer are mechanically entangled with each other and with the scrim.

In another aspect, embodiments of the invention provide a filter media in which the filter media is a scrim-supported needlefelt and in which needlepunching entangles the OPAN fibers, the fibers of the at least one other polymer, and the scrim to form the scrim-supported needlefelt.

In another aspect, embodiments of the invention provide a filter media in which the filter media has the following properties: a basis weight of between 10 and 16 ounces/square yard; an air permeability of between 20 and 200 cfm @ ½ inch of water column pressure, measured according to ASTM D737; a tensile strength in a machine direction of fabric of at least 75 pounds, measured according to ASTM D5035-11; a tensile strength in a cross-direction of fabric of at least 75 pounds, measured according to ASTM D5035-11; and a Mullen burst strength of at least 175 PSI, measured according to ASTM D751 using a Mullen tester.

In another aspect, embodiments of the invention provide a filter media in which the filter media has a shrinkage property at 400° F. for 2 hours that is not greater than 2% in both the machine direction and the cross-direction.

In another aspect, embodiments of the invention provide a filter media in which the fibers of the at least one other polymer include a fiber or fibers formed from at least one of the materials of the group including: polytetrafluoroethylene, polyetherimide, meta-aramid and polyphenylene sulfide.

In another aspect, embodiments of the invention provide a filter media in which the filter media fibers are staple fibers having an average diameter of between 10 and 30 microns, and a length of at least 2 inches.

In another aspect, embodiments of the invention provide a filter element including the filter media.

In another aspect, embodiments of the invention provide a filter element further including a support cage structure such that the filter media forms a bag configured to surround the support cage structure.

In another aspect, embodiments of the invention provide a filter element in which the filter media is a needlefelt formed via needlepunching the OPAN fibers and the fibers of the at least one other polymer.

In another aspect, embodiments of the invention provide a filter element in which the filter element is a pleated filter in the form of a panel filter having a border frame or an annular ring element having filter media extending between opposed end caps.

In another aspect, embodiments of the invention provide a filter element in which the filter media has a Mullen Burst Strength of at least 300 psi after exposure to 1 Normal sulfuric acid for 15 minutes at a temperature of 80° C.

In another aspect, embodiments of the invention provide a filter element in which the filter media does not experience more than a 25% drop in Mullen Burst Strength after exposure to 1 Normal sulfuric acid for 15 minutes at a temperature of 80° C.

In another aspect, embodiments of the invention provide a filter element in which the filter media experiences less than 1% shrinkage in both the machine-direction and cross-direction of the filter media after exposure to temperatures of 400° C. for 2 hours.

In another aspect, embodiments of the invention provide a filter element in which the filter media has the following properties when tested per VDI/DIN-3926 and ASTM D6830-02 standards: a residual pressure drop increase over a period of testing of no greater than 0.3 water column; an emission of less than 0.0010 grams/dscm; and a loading cycle time between pulses of greater than 200 seconds.

In another aspect, embodiments of the invention provide a method of using the filter element including the steps of subjecting the filter to an industrial gas flow in an industrial process gas application; and flowing the industrial gas through the filter element such that less than 0.0050 g/dscm of particulate matter contained in the industrial gas passes through the filter element.

In another aspect, embodiments of the invention provide a method of using the filter element in which the industrial process gas application is one of a cement factory, lime kiln, asphalt process, rock dust application, and coal fired boiler.

In another aspect, embodiments of the invention provide a method of using the filter element in which the industrial gas flow includes an elevated temperature during filtering of at least 300° F.

In another aspect, embodiments of the invention provide a method of manufacturing the filter media. The method includes the steps of: providing the OPAN fibers; providing the fibers of the at least one other polymer; blending the OPAN fibers and the fibers of the at least one other polymer to form a loose batt; and joining the OPAN fibers and the fibers of the at least one other polymer to form the filter media.

In another aspect, embodiments of the invention provide a method of manufacturing the filter media in which the filter media is a self-supported needlefelt and in which the joining step is performed by needlepunching the loose batt.

In another aspect, embodiments of the invention provide a method of manufacturing the filter media further including the step of depositing the loose batt on a scrim prior to the joining step and in which the joining step is performed by needlepunching the loose batt into the scrim.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

In general, a filter media including a blend of fibers is provided. The blend of fibers includes between 30 wt % and 95 wt % oxidized polyacrylonitrile (OPAN) fibers, and preferably at least 50 wt % OPAN fibers, and at least one other polymer fiber, such as PPS and/or meta-aramid. The other fibers, such as PPS and/or meta-aramid fibers, may comprise between 5 wt % and 70 wt % of the blend and preferably at most 50 wt % of the blend.

Attempts to use OPAN fibers in a filter media have been unsuccessful because the OPAN fibers are difficult to manufacture into filter media fabric. For instance, the OPAN fibers tend to be so brittle that the fibers break during normal filter manufacturing techniques, such as needlepunching or hot calendaring. Thus, to this point, OPAN fibers have not been used in, for instance, hot gas filtration. Therefore, the state of the art has not satisfied this and other needs.

This fiber blend incorporating the OPAN fibers may be processed into a nonwoven fabric, such as needlefelt, in order to create the filter media.

Further, the nonwoven fabric can be self-supported or supported with a substrate, such as a scrim.

In one aspect, the filter media is incorporated into a filter element, such as a bag filter or a pleated filter element, for use in highly acidic and/or oxidizing environments, including cement factories, lime kilns, asphalt processes, rock dust applications, and coal fired boilers. However, as will be recognized by those skilled in the art from the following description, such embodiments are provided by way of example only, not by way of limitation, and that all alternative embodiments are reserved herein.

Figure 1A:
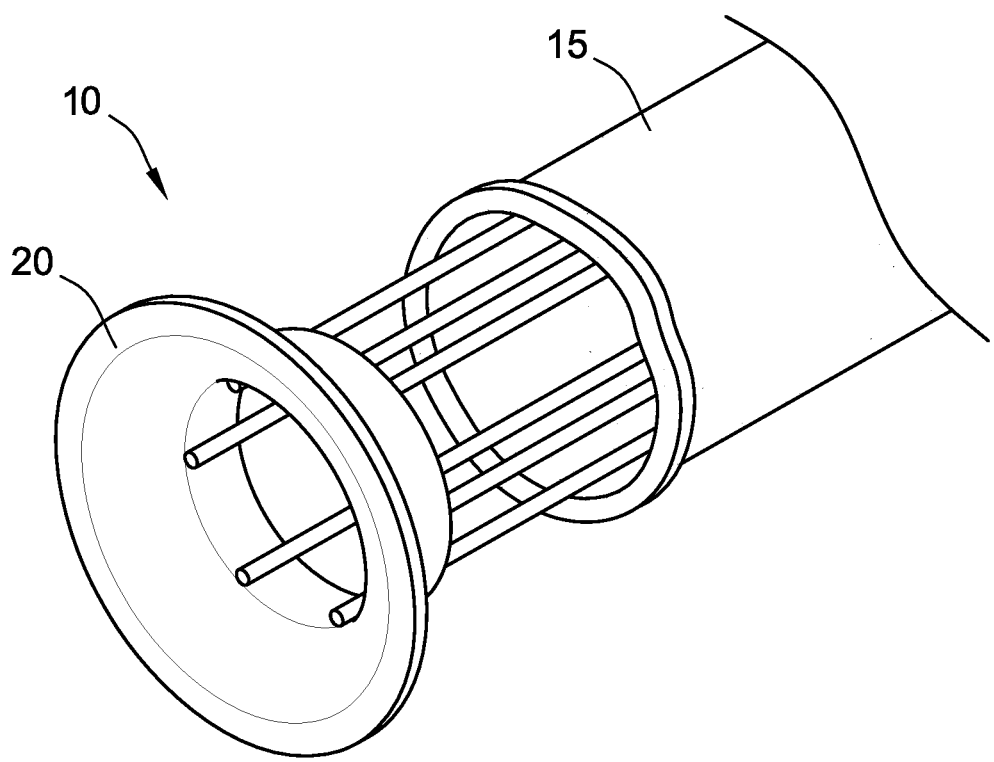
FIGS. 1A-1B depict a bag filter element with internal support cage structure according to an exemplary embodiment.
Figure 1B:
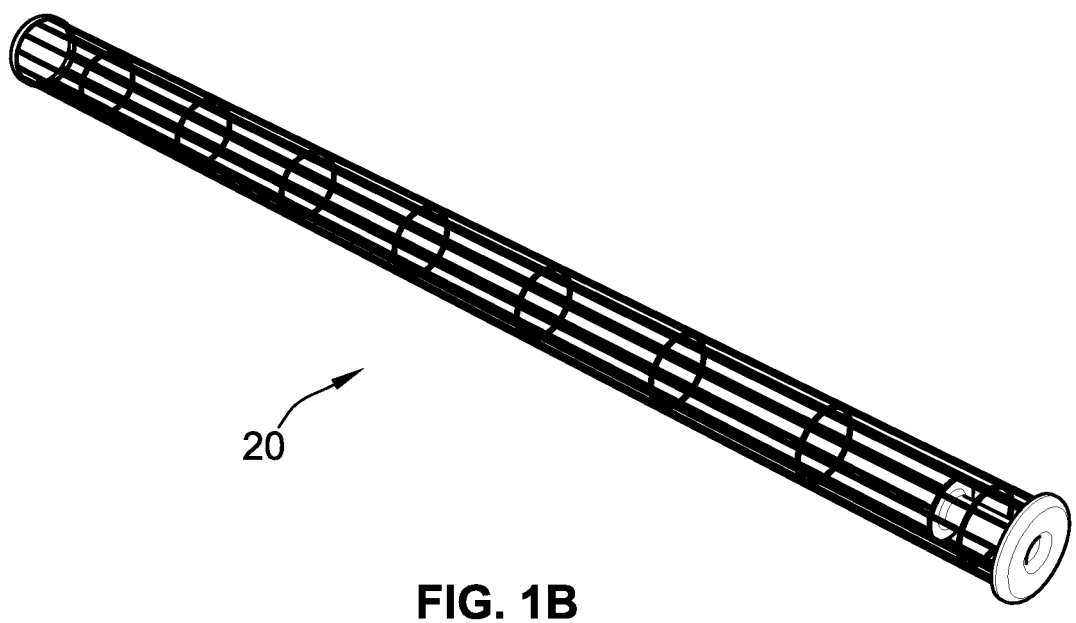

According to an embodiment depicted in FIG. 1A, a filter element 10 is provided that includes a filter media 15. The filter media 15 is configured into the shape of an elongated bag adapted to be received onto a support cage structure 20 (shown in FIG. 1B). The support cage structure 20 defines the shape of the filter element 10, which is depicted as being tubular in FIGS. 1A and 1B. The elongated bag of filter media 15 is designed to cover a support cage structure that is typically between 1 meter and 8 meters long and between 10 cm and 20 cm wide.

Figures 2A, 2B:
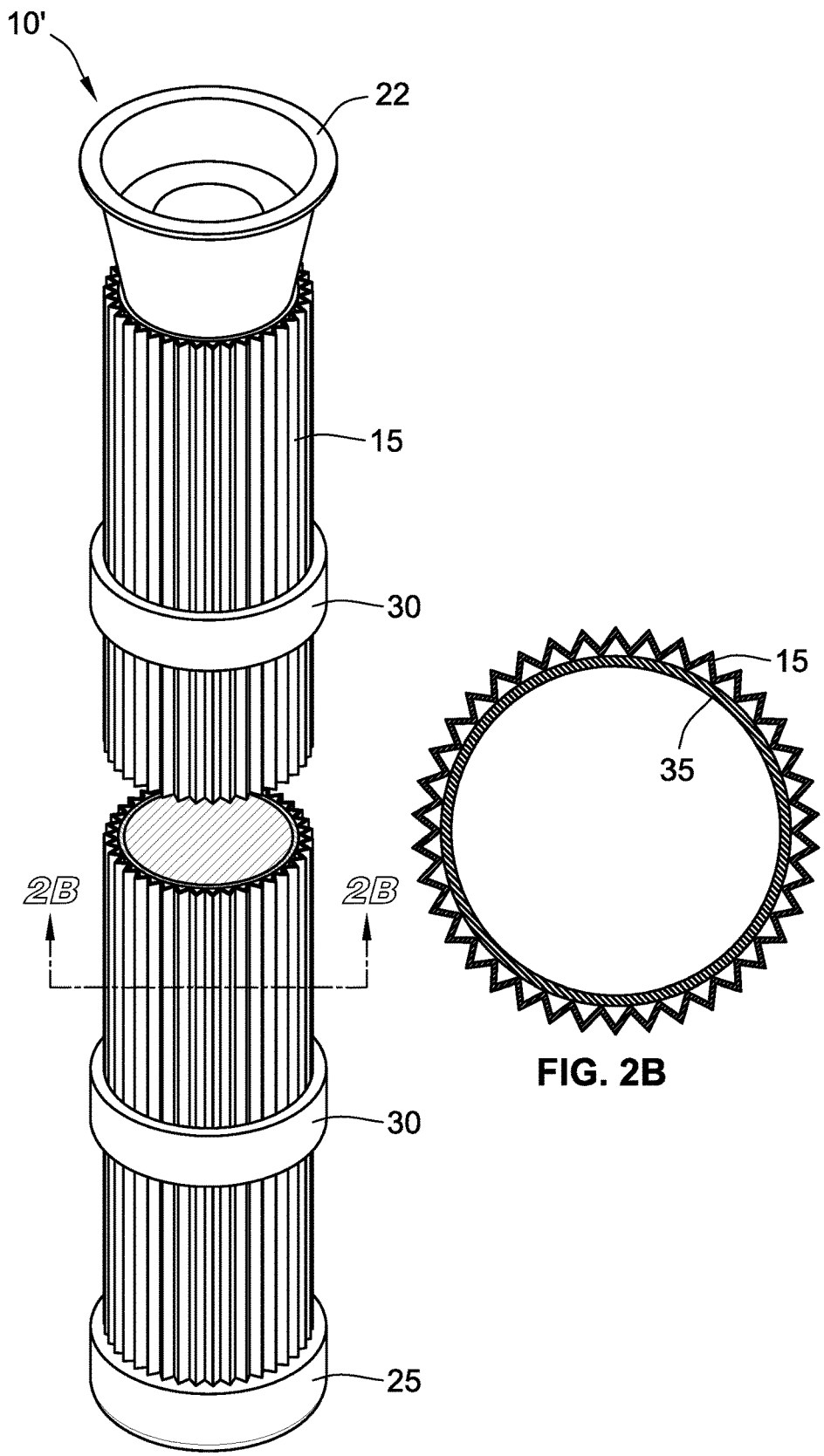
FIGS. 2A-2B depict a pleated filter element according to an exemplary embodiment.

According to another embodiment depicted in FIG. 2A, a pleated filter element 10' is provided that includes a filter media 15 that spans a longitudinal distance between a first end cap 22 and a second end cap 25. As shown in FIG. 2A, the filter media 15 is pleated such that the filter media 15 includes a plurality of longitudinal folds. The filter media 15 defines a substantially tubular shape of the filter element 10'.

The shape of the filter media 15 can be reinforced with one or more annular ring elements 30. As shown in FIG. 2B, the filter media 15 is further supported by an internal screen 35; however, in other embodiments, the annular ring element and/or the screen is not provided.

Figure 3A:
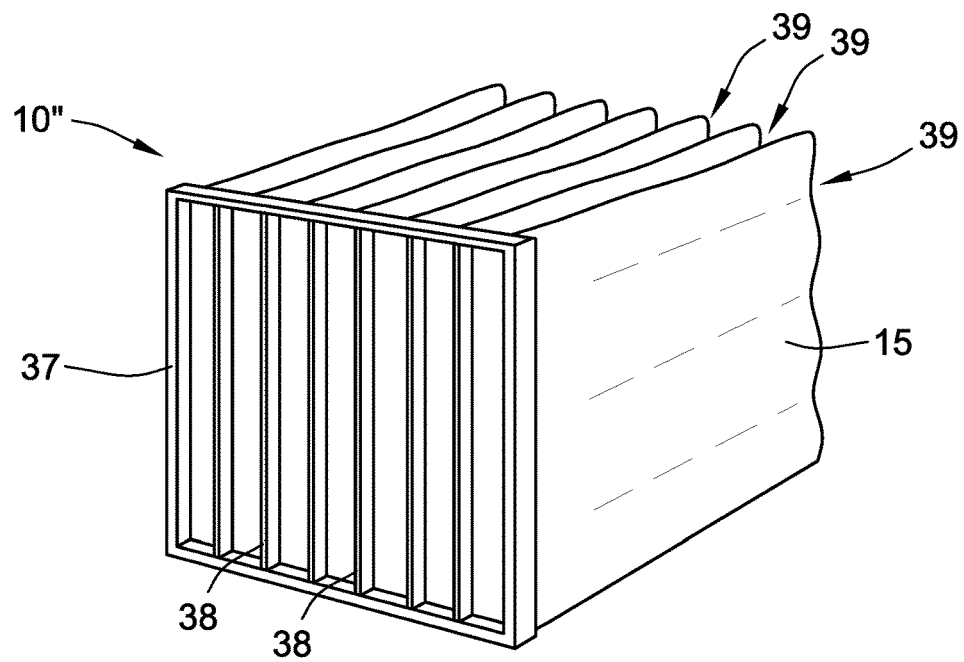
FIG. 3A is another bag filter element according to an exemplary embodiment.

FIG. 3A shows another embodiment of a bag filter element 10". The bag filter element 10" has a frame 37 with cross members 38. Supported on the frame 37 and cross members 38 are a series of bags 39 made from the filter media 15.

Figure 3B:
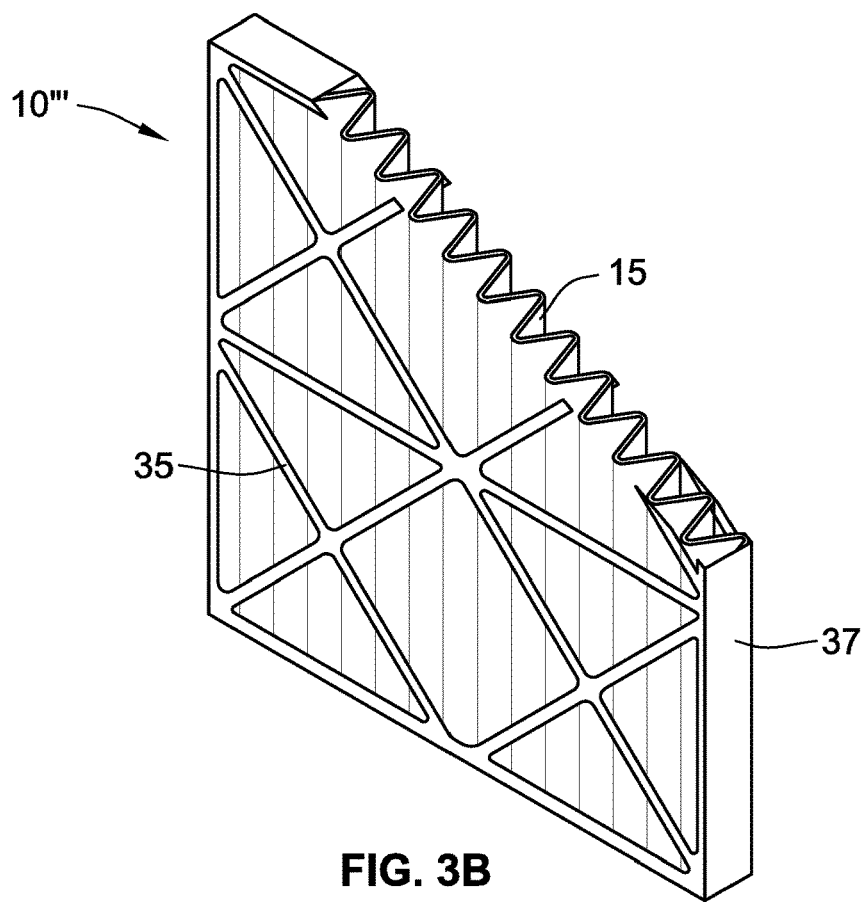
FIG. 3B is a panel filter element according to an exemplary embodiment.

FIG. 3B depicts still another alternate embodiment in which the filter element is a panel filter 10''', having a border frame 37 and a screen 35.

The same filter media 15 can be used for any of the above-described filter elements. Moreover, as shown, the filter media 15 can be pleated in some embodiments.

The filter media 15 includes a fiber blend comprising at least two fibers. The first fiber is oxidized polyacrilonitrile (OPAN), and the OPAN fibers comprise between about 30 wt % and about 95 wt % of the fiber blend. Typically, the OPAN fibers will comprise between about 50 wt % and about 95 wt % of the fiber blend and preferably between about 50 wt % and about 65 wt % of the fiber blend. The remaining fibers can be one or more of another polymeric fiber, especially a polymeric fiber having high temperature resistance and high tensile strength, including meta-aramid, polyphenylene sulfide, polytetrafluoroethylene (PTFE), polyetherimide (PEI), and/or polycyclohexylenedimethylene terephthalate (PCT).

The fiber blend is formed into a woven or nonwoven fabric through thermal, mechanical, or thermo-mechanical joining to form the filter media.

FIG. 3 is an illustration of a system 40 for use in carrying out a method for manufacturing a nonwoven fabric filter media 15 in accordance with an embodiment of the present invention. In this embodiment, the method comprises entraining the OPAN fibers 42 and the fibers 43 of the at least one other polymer (collectively, "the polymeric fibers") in a stream of moving air within respective chambers 45a, 45b to form a loose batt 47 of polymeric fibers.

In an embodiment, the polymeric fibers are staple fibers. The OPAN fibers 42 have a staple length of between 2 and 4 inches and a typical diameter of approximately 15 microns. The fibers 43 of the at least one other polymer preferably have a staple length of between 2 and 4 inches and a typical diameter of approximately 15 microns.

Figure 4A:
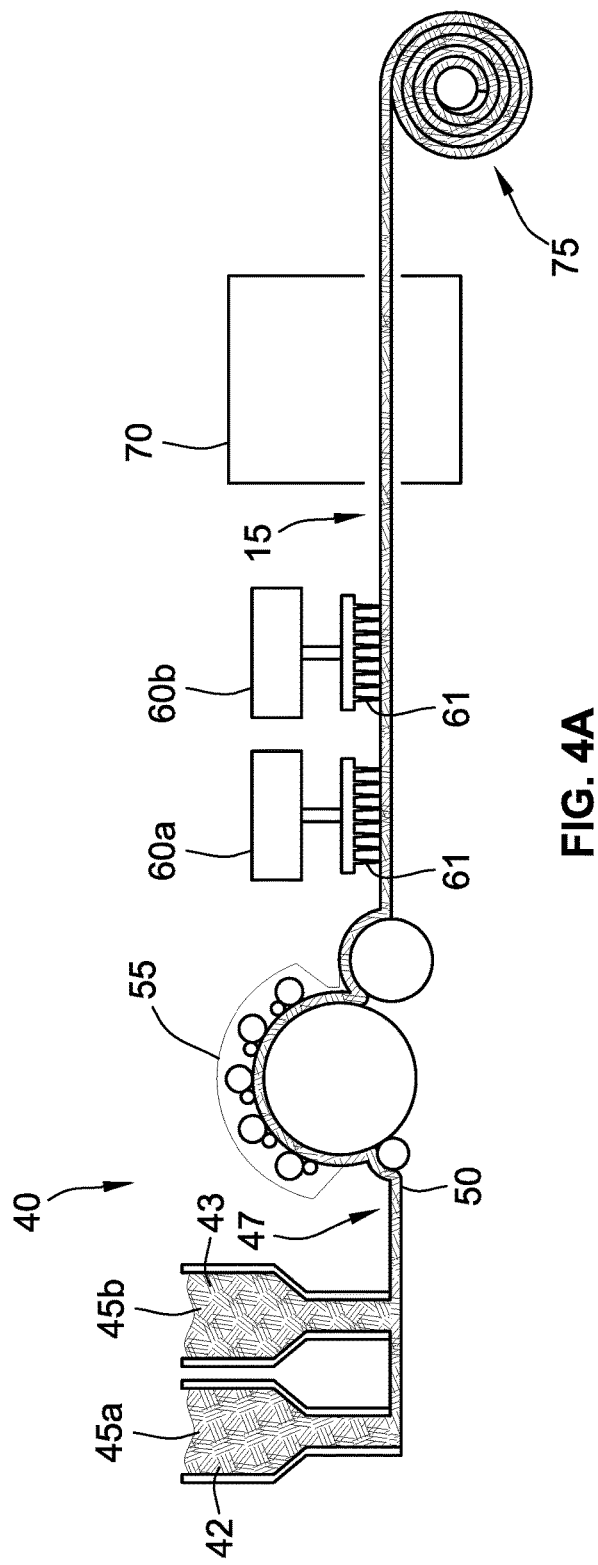
FIGS. 4A-4B are a schematic representation of the manufacturing steps for a fiber blend filter media according to an exemplary embodiment.

The loose batt 47 of polymeric fibers is then collected onto a moving forming surface 50 and transported to a carding machine 55 to form a carded web 57. The carding machine 55 contains a plurality of needles on the surface of a large cylinder that comb the polymeric fibers 42, 43 to remove tangles and orient the polymeric fibers 42, 43 into the carded web 57. The carded web 57 then under goes at least one round of needle-punching on a needle-punch machine 60a. As depicted in FIG. 4A, the system includes two needle-punch machines 60a, 60b, but systems with up to three needle-punch machines are not uncommon. The needle-punch machines 60a, 60b mechanically entangle the polymeric fibers using barbed needles 61 to form the filter media 15. Through the processing steps shown in FIG. 4A, the filter media 15 takes on the form of a nonwoven fabric, specifically a self-supported needlefelt.

In another embodiment, the polymeric fibers are supported on a substrate, also known as a scrim, to provide a supported needlefelt. The scrim is typically a woven fabric. Further, the scrim can be located above the polymeric fibers, below the polymeric fibers, or in the middle of the polymeric fibers during manufacturing.

In an embodiment, the scrim is made from fibers that have resistance to high temperatures and have a high tensile strength, such as PPS, meta-aramid, PTFE, PEI, and/or PCT. In a preferred embodiment, the scrim includes OPAN fibers.

Figure 5:
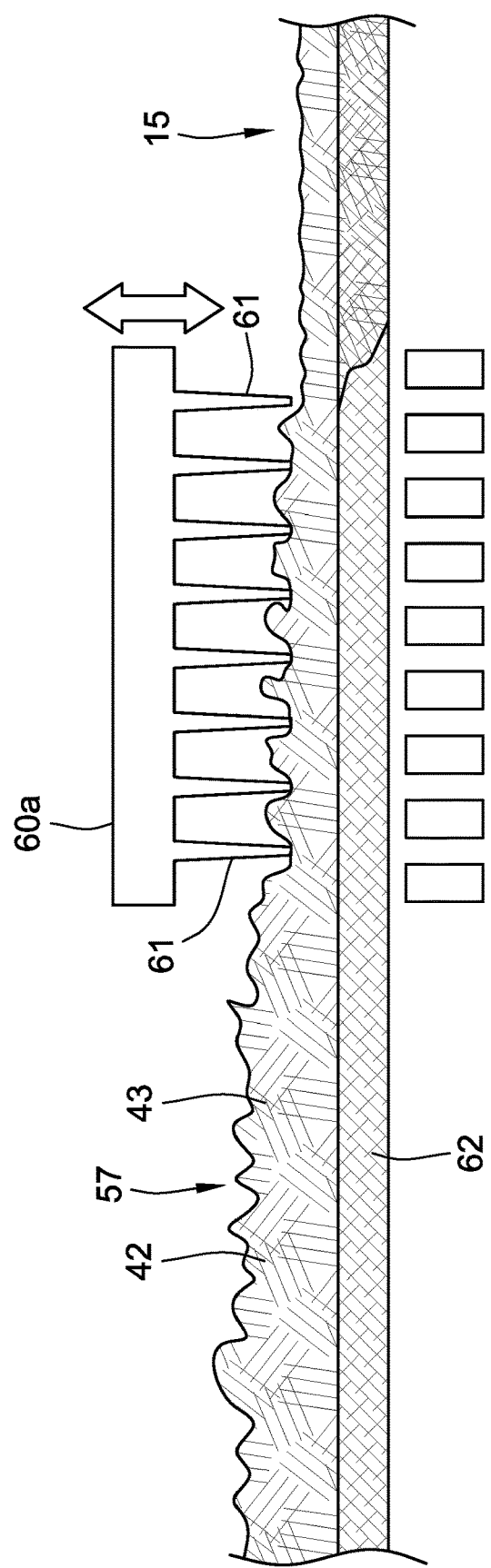
FIG. 5 is a schematic cross section of a scrim-supported filter media undergoing needle-punching according to an exemplary embodiment.

During the exemplary manufacturing process for a supported needlefelt depicted in FIG. 5, the carded web 57 of polymeric fibers, including OPAN fibers 42 and the fibers 43 of at least one other polymer, is overlaid the scrim 62 prior to needle-punching. The needles 61 of needle-punch machine 60a punch the polymeric fibers 42, 43 into the scrim 62 to produce the filter media 15. While a single needle-punch machine 60a is depicted in FIG. 5, the manufacturing process could contain multiple needle-punch machines, such as up to three needle-punching machines.

Generally, the steps outlined above will produce a filter media 15 with suitable properties for industrial air filtration. Suitable properties for a filter media 15 include: basis weight of between 10 and 16 ounces/square yard (oz/yd$^2$), measured according to ASTM D461-11; an air permeability of between 20 and 200 cubic feet per minute (cfm) @ 0.5 inch of water column pressure (in. W.C.), measured according to ASTM D737; a tensile strength in a machine direction of fabric of at least 75 pounds (lbs.), measured according to ASTM D5035-11; a tensile strength in a cross-direction of fabric of at least 75 pounds (lbs.), measured according to ASTM D461-11; and a Mullen burst strength of at least 175 pounds per square inch (PSI), measured on a Mullen tester according to ASTM D751.

Returning to FIG. 4A, in the embodiment depicted, the filter media 15 is through-air bonded in an oven 70. The oven 70 may comprise any type of through-air bonding oven known in the art. Within the oven 70, hot air is drawn through the filter media 15 to soften or melt the fibers of the at least one other polymer so that the polymeric fibers are bonded together. Where it is desired to at least partially melt the at least one other polymeric fiber, the oven would be set to the melting temperature of that fiber. For example, where the at least one other polymeric fiber is PPS, the oven temperature can be between about 260° C. (500° F.) and about 316° C. (600° F.) to both bond the polymeric fibers and stiffen the filter media 15. Upon exiting the oven, the polymeric fibers of the filer media are bonded together and the filter media has a uniform stiffness.

As shown in FIG. 4A the filter media 15 is collected in a roll 75 for storage or further processing. The take-up for the roll 75 can be provided directly after the needle-punching machine 60a or 60b. Additionally, the take-up for the roll 75 can be placed after the oven 70 in embodiments using the oven 70.

The roll 75 can be transported to a different manufacturing line for further processing. For instance, in the embodiment depicted in FIG. 4B, the filter media 15 can be further calendared by calendaring rolls 77 to increase the density and reduce the thickness of the filter media 15.

Figure 4B:
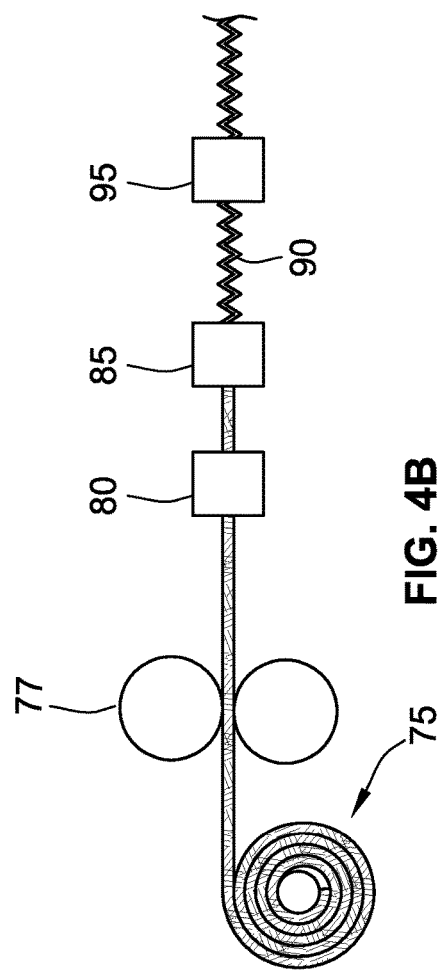

As illustrated in FIG. 4B, calendaring is performed by one set of calendar rolls 77. It should be understood, however, that other methods known in the art may be used to densify the filter media 15. For example, the filter media 15 may be calendared in several consecutive calendar rolls or in an S-wrap configuration, for example. In alternate aspects, the calendar rolls 77 may be heated to a nominal temperature. In addition, the filter media may be point bonded or flat bonded by the calendar rolls 77.

Calendaring is commonly performed to make the filter media more susceptible to pleating. Thus, as depicted in FIG. 4B, the filter media 15 is transported from the calendaring rolls 77 to a preheat oven 80 where the filter media 15 is softened. From the preheat oven 80, the filter media 15 is transported to a pleating machine 85 and finally to a post heat oven 95. The post-heating step heats the pleated filter media 15 and applies a back pressure in the machine direction to set the pleats.

It should be understood that each of the steps of the method depicted in FIGS. 4A and 4B may be carried out on the same or different manufacturing line despite the depiction of certain groups of steps being performed on the same or different manufacturing lines in FIGS. 4A and 4B. Moreover, the manufacturing line can contain less than all the steps depicted as well additional steps not depicted. In some instances, the ordering of the steps can also be modified.

Additionally, other manufacturing techniques may be utilized to obtain the filter media 15. Thus, while needlepunching has been discussed with reference to FIGS. 4A and 5, other methods of obtaining a nonwoven fabric filter media are also envisioned. For instance, the nonwoven fabric filter media can be created from staple polymeric fiber webs in which the fibers are wet-laid or dry-laid, including parallel-laid, cross-laid, and randomly-laid. Further, the nonwoven fabric filter media can be created from a continuous filament web, including spun laid webs and melt blown webs.

Further still, the nonwoven webs can be formed into a filter media through additional mechanical bonding techniques, such as stitch bonding and hydroentanglement; chemical or adhesive bonding techniques, such as saturation adhesive bonding, spray adhesive bonding, foam bonding, powder application, print bonding, and discontinuous bonding; thermal bonding techniques, such as hot calendaring, belt calendaring, through-air thermal bonding, ultrasonic bonding, and radiant-heat bonding; and spunbonding techniques, as well as combinations of the listed techniques.

Example 1

Filter media was created using a 50/50 wt % blend of OPAN fibers and meta-aramid fibers. The blend of fibers was needlepunched into a scrim-supported needlefelt. The scrim was fiberglass having a density of 2.4 oz/yd$^2$. The formed filter media had a basis weight of 12.9 oz/yd$^2$, air permeability of 48.3 cfm/ft$^2$ at 0.5 in. W.C., a tensile strength in the machine direction of 237 lbs., a tensile strength in the cross-direction of 81 lbs., a Mullen burst strength of 360 psi, and shrinkage of 0.17% in the machine direction and 0.25% in the cross direction after exposure to a temperature of 400° F. for two hours.

Example 2

Filter media was created using a 50/50 wt % blend of OPAN fibers and meta-aramid fibers. The blend of fibers was needlepunched into a self-supported needlefelt (i.e., it did not include a scrim). The filter had a basis weight of 13.1 oz/yd$^2$, air permeability of 40.7 cfm/ft$^2$ at 0.5" W.C., a tensile strength in the machine direction of 263 lbs., a tensile strength in the cross-direction of 106 lbs., a Mullen burst strength of 360 psi, and shrinkage of 0.75% in the machine direction and 1.0% in the cross direction after exposure to a temperature of 400° F. for two hours.

A control sample (Control 1) composed of 100% meta-aramid fibers was needlepunched to form a self-supported needlefelt (i.e., having no scrim). The filter had a basis weight of approximately 13.5 oz/yd$^2$, air permeability of 48.0 cfm/ft$^2$ at 0.5" W.C., a tensile strength in the machine direction of 303 lbs., a tensile strength in the cross-direction of 180 lbs., a Mullen burst strength of 450 psi, and shrinkage of 1.5% in the machine direction and 1.2% in the cross direction after exposure to a temperature of 400° F. for two hours.

The filter media of Example 1 and Control 1 were acid dip tested, which involved exposing the filter media to 1 Normal sulfuric acid for 15 minutes at a temperature of 80° C. After acid exposure, each sample was washed with water and dried. The filters were then tested according to ASTM 751, using a Mullen tester, to determine the effect of the acid exposure on each filter's Mullen burst strength. Table 1, below, summarizes the findings. As can be seen in Table 1, Example 1 experienced a drop in Mullen burst strength of less than 15%, while Control 1 experienced a drop in Mullen burst strength of greater than 50%. Thus, the fiber blend filter media including OPAN fibers performed significantly better than the 100% meta-aramid fiber filter media even though Example 1 still contained 50 wt % meta-aramid fibers.

TABLE 1

Effect on Mullen Burst Strength after Acid Exposure

| Sample | Initial Mullen Burst strength (psi) | Percentage drop (%) as result of acid exposure |
| --- | --- | --- |
| Control 1 | 450 | 55% |
| Example 1 | 360 | 14.6% |

The samples were also tested for use as dust collection filter media according to the VDI/DIN-3926 and ASTM D6830-02 standards for cleanable filters. The test involves blowing pulses of dust having an average particle diameter of about 1.5 μm onto the filter media and running air through the media until a pressure drop of 4 in. W.C. across the filter is reached. Airflow through the filter is stopped to allow the filter media to release any dust that it is capable of releasing, and then the filter media is again pulsed with dust. The test is performed until the filter fails. Three properties were measured: residual pressure drop over the period of testing, emissions through the filter media, and the loading cycle time between pulses. The residual pressure drop is a cumulative effect on the filter in that each time dust is pulsed on the filter media, the filter media is unable to fully release all the dust that has collected within the filter media. The emissions refer to the amount of dust that was able to penetrate through the filter media, and the loading cycle time between loading corresponds to the length of time that it took for the filter media to reach 4 in. W.C. such that the filter media was pulsed with dust again. For this test, a second control sample (Control 2) composed of 100% PPS fibers was also included. Control 2 had a basis weight of 15.1 oz/yd$^2$. The results of the dust collection test are summarized in Table 2, below.

TABLE 2

Dust Collection Test (VDI/DIN-3926 and ASTM D6830-02)

| Sample | Residual DP increase over the period of testing (in. W.C.) | Emissions | Loading cycle time between pulses (seconds) |
| --- | --- | --- | --- |
| Control 1 | 0.70 | 0.00141 grams/dscm | 165 s |
| Example 1 | 0.01 | 0.00012 grams/dscm | 530 s |
| Example 2 | 0.01 | 0.00001 grams/dscm | 490 s |
| Control 2 | 0.62 | 0.00191 grams/dscm | 180 s |

Table 2 demonstrates that the filter media containing OPAN fibers perform significantly better than the solely meta-aramid or PPS filter media. As shown in Table 2, the meta-aramid and PPS filter media retained a much higher pressure drop after testing than Examples 1 and 2, containing the OPAN fibers. The low residual DP increase of Examples 1 and 2 indicates that dust is mostly held on the surface of the filter, i.e., the dust does not penetrate far into the filter media, such that the filter media is able to more easily release the dust on the surface between pulses. This also translated to lower dust emissions than the Control 1 and Control 2 by at least an order of magnitude and up to two orders of magnitude. Finally, the loading cycle times between pulses was also substantially higher, indicating that the filter media of Examples 1 and 2 were far less prone to clogging.

The filtering properties of the filter media comprising the blend of OPAN fibers substantially exceeded expectations. First, the inventors were surprised that the blend of fibers was able to withstand the mechanical and thermal stresses inherent to forming a filter media. The present blending method enables the use of relatively brittle OPAN fibers without the substantial drawbacks of OPAN fiber properties that would occur if used alone due to brittleness. It will be appreciated to a person having ordinary skill in the art that different filter media blends are contemplated between 30 wt % and 95 wt % OPAN fibers, which have substantial benefits over existing PPS and meta-aramid filter media.

Second, the inventors were surprised to find that the inclusion of OPAN fibers so drastically diminished the drop in burst strength after acid exposure. The inventors surmise that the increase in after-exposure burst strength is attributable, at least in part, to the porosity of the OPAN fibers. The OPAN fibers are created by oxidizing polyacrylonitrile fibers at a temperature of approximately 210° C. to increase the carbon content of the fiber, which increases the porosity and surface area of the fiber. It is theorized that this increase in porosity and surface area causes the OPAN fibers to absorb the acid, preventing the acid from degrading the other polymeric fibers in the blend.

Third, the inventors were surprised that the OPAN blend increased the filtering efficiency so far beyond the conventionally used industrial filtering media of PPS and meta-aramid. The inventors attribute the increase filtering efficiency again, in part, to the increased surface area and porosity of the OPAN fibers, which holds more dust and particulate at the surface of the filtering media and which prevents the dust and particulate from penetrating deep into or through the filtering media. Accordingly, the OPAN blend filter media is able to avoid the quick buildup of a residual pressure drop because the dust and particulate are able to drop off of the surface of the filter media at times of low air pressure on the filter media.

As mentioned above, the filter media comprised of the OPAN fiber blend is envisioned for use in highly acidic environments, including cement factories, lime kilns, asphalt processes, rock dust applications, and coal fired boilers. In such applications, the filter media is able to provide a residual pressure drop of less than 0.3 in. W.C., and preferably less than 0.05 in W.C., emission less than 0.0050 grams/dscm, preferably less than 0.0010 grams/dscm and more preferably less than 0.0005 grams/dscm, and a loading cycle time between pulses of greater than 200 seconds, and preferably greater than 400 seconds. Additionally, the filter media will provide such properties at operation temperatures of greater than 200° F., and preferably greater than 350° F.

While two examples of a fiber blend filter media including 50/50 wt % OPAN and meta-aramid fibers have been demonstrated, weight ratios having more or less OPAN fibers are contemplated. For instance, more OPAN fibers can be used in the fiber blend to increase the acid resistance if strength is less of a concern. As discussed above, up to 95 wt % OPAN fibers can be used, although typically the OPAN fibers will not make up more than 80 wt % of the fiber blend.

Conversely, less than 50 wt % OPAN fibers can be used in the blend where strength is of greater concern than acid resistance. As discussed above, the fiber blend will typically include at least 30 wt % OPAN fibers.

Moreover, the features, aspects, and embodiments of the fiber blend and fiber blend filter media discussed above can be used in combination with one another.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A filter media, comprising:
   a scrim; and
   a blend of filter media fibers, consisting of oxidized polyacrylonitrile (OPAN) fibers and fibers of at least one other polymer selected from the group consisting of polytetrafluoroethylene, polyetherimide, meta-aramid, polycyclohexylenedimethylene terephthalate, and polyphenylene sulfide;
   wherein the OPAN fibers comprise between 30% and 95% by weight of the blend.

2. The filter media according to claim 1, wherein the at least one other polymer is meta-aramid.

3. The filter media according to claim 1, wherein the at least one other polymer is polyphenylene sulfide (PPS).

4. The filter media according to claim 1, wherein the OPAN fibers and the fibers of the at least one other polymer are mechanically entangled.

5. The filter media according to claim 4, wherein the filter media is a needlefelt and wherein needlepunching entangles the OPAN fibers and the fibers of the at least one other polymers to form the needlefelt.

6. The filter media according to claim 1, wherein the OPAN fibers and the fibers of the at least one other polymer are mechanically entangled with each other and with the scrim.

7. The filter media according to claim 6, wherein the filter media is a scrim-supported needlefelt and wherein needlepunching entangles the OPAN fibers, the fibers of the at least one other polymer, and the scrim to form the scrim-supported needlefelt.

8. The filter media according to claim 1, wherein the filter media has the following properties:
  a basis weight of between 10 and 16 ounces/square yard;
  an air permeability of between 20 and 200 cfm @ ½ inch of water column pressure, measured according to ASTM D737;
  a tensile strength in a machine direction of fabric of at least 75 pounds, measured according to ASTM D5035-11;
  a tensile strength in a cross-direction of fabric of at least 75 pounds, measured according to ASTM D5035-11; and
  a Mullen burst strength of at least 175 PSI, measured according to ASTM D751 using a Mullen tester.

9. The filter media according to claim 1, wherein the filter media has a shrinkage property at 400° F. for 2 hours that is not greater than 2% in both a machine direction and a cross-direction.

10. The filter media of claim 1, wherein the filter media fibers are staple fibers having an average diameter of between 10 and 30 microns, and a length of at least 2 inches.

11. A filter element comprising the filter media of claim 1.

12. The filter element of claim 11, further comprising a support cage structure, wherein the filter media forms a bag configured to surround the support cage structure.

13. The filter element of claim 12, wherein filter media is a needlefelt formed via needlepunching the OPAN fibers and the fibers of the at least one other polymer.

14. The filter element of claim 11, wherein the filter element is a pleated filter in the form of a panel filter having a border frame or an annular ring element having filter media extending between opposed end caps.

15. The filter element of claim 11, wherein the filter media has a Mullen Burst Strength of at least 300 psi after exposure to 1 Normal sulfuric acid for 15 minutes at a temperature of 80° C.

16. The filter element of claim 11, wherein the filter media does not experience more than a 25% drop in Mullen Burst Strength after exposure to 1 Normal sulfuric acid for 15 minutes at a temperature of 80° C.

17. The filter element of claim 11, wherein the filter media experiences less than 1% shrinkage in both the machine-direction and cross-direction of the filter media after exposure to temperatures of 400° C. for 2 hours.

18. The filter element of claim 11, wherein the filter media has the following properties when tested per VDI/DIN-3926 and ASTM D6830-02 standards:
  a residual pressure drop increase over a period of testing of no greater than 0.3 water column;
  an emission of less than 0.0050 grams/dscm; and
  a loading cycle time between pulses of greater than 200 seconds.

19. A method of using the filter element of claim 11, comprising:
  subjecting the filter element to an industrial gas flow in an industrial process gas application; and
  flowing the industrial gas through the filter element such that less than 0.0050 g/dscm of particulate matter contained in the industrial gas passes through the filter element.

20. The method of claim 19, wherein the industrial process gas application is one of a cement factory, lime kiln, asphalt process, rock dust application, and coal fire boiler.

21. The method of claim 19, wherein the industrial gas flow includes an elevated temperature during filtering of at least 300° F.

22. A method of manufacturing the filter media of claim 1, the method comprising the steps of:
  providing the OPAN fibers;
  providing the fibers of the at least one other polymer;
  blending the OPAN fibers and the fibers of the at least one other polymer to form a loose batt; and
  joining the OPAN fibers and the fibers of the at least one other polymer to form the filter media.

23. The method according to claim 22, wherein the filter media is a self-supported needlefelt and wherein the joining step is performed by needlepunching the loose batt.

24. The method according to claim 22, further comprising the step of depositing the loose batt on a scrim prior to the joining step and wherein the joining step is performed by needlepunching the loose batt into the scrim.

25. The filter media according to claim 6, wherein the scrim comprises a fiberglass.

* * * * *